No. 859,573.  
PATENTED JULY 9, 1907.

W. G. McMILLAN.
ANGLE COCK.
APPLICATION FILED JAN. 25, 1907.

Witnesses  
Inventor  
William G. McMillan.  
Attorneys.

UNITED STATES PATENT OFFICE.

WILLIAM G. McMILLAN, OF CONNEAUT, OHIO.

ANGLE-COCK.

No. 859,573.  Specification of Letters Patent.  Patented July 9, 1907.

Application filed January 25, 1907. Serial No. 354,083.

*To all whom it may concern:*

Be it known that I, WILLIAM G. MCMILLAN, a citizen of the United States, residing at Conneaut, in the county of Ashtabula and State of Ohio, have invented certain new and useful Improvements in Angle-Cocks, of which the following is a specification.

This invention is a stop cock, particularly adapted for use on train pipes of automatic air brake systems.

The object of the invention is to provide a cock which cannot be tampered with without giving notice thereof to the engineer. This avoids a cutting out of cars on the train for illegitimate purposes.

A further object of the invention is to provide a release valve which can be operated by any of the trainmen to set the brakes in an emergency. The same valve can be used as a signal valve to slightly apply the brakes and thus attract the attention of the engineer.

The invention is illustrated in the accompanying drawings, in which

Figure 1:
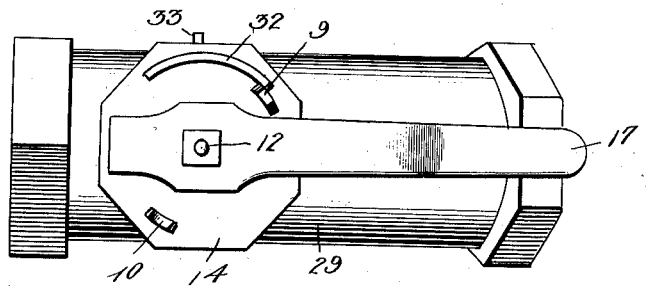
Figure 2:
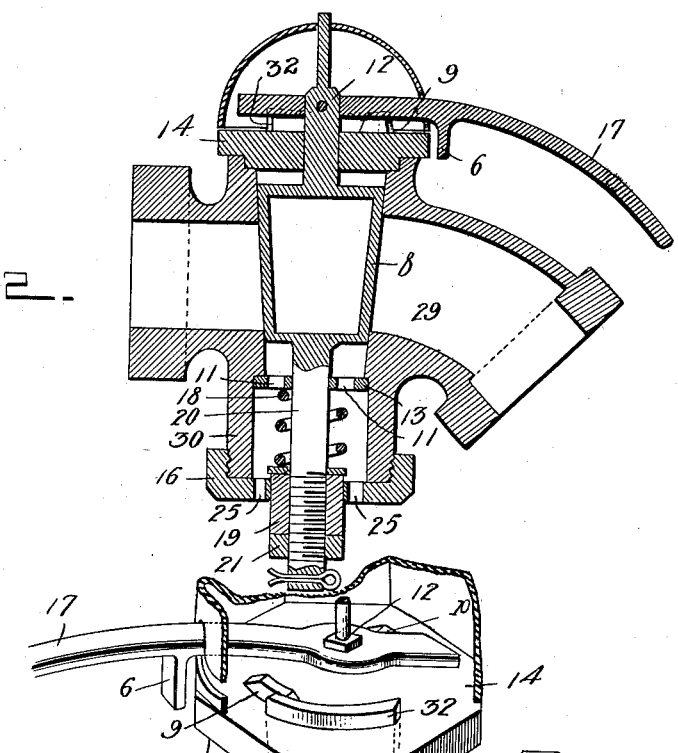
Figure 3:
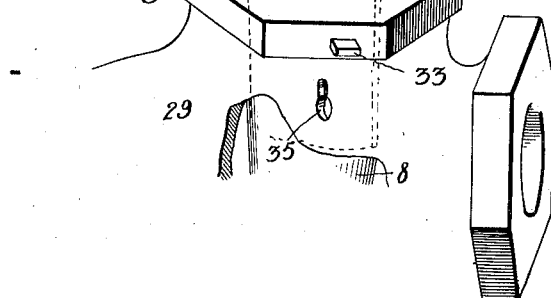

Figure 1 is a top plan view of the cock. Fig. 2 is a central vertical section thereof. Fig. 3 is a detail in perspective illustrating certain features of the device.

Referring specifically to the drawings, 29 indicates the valve casing having therein a tapered bore for the tapered plug valve 8. This valve has a stem 12 at the head or top which extends through the cap 14 on top of the valve casing and receives the lever handle 17, which is securely fixed to the valve stem by a pin or otherwise. The stem 12 is round where it passes through the cap 14, in order to allow the cock to be turned by the handle 17. The lower end of the plug has a stem 20 extending through a depending cylindrical extension 30 on the casing, which extension is provided with a cap 16 screwed thereon. A spring 18 is coiled around the stem 20 between a washer 13 at the top and adjusting nut 19 at the bottom. The spring normally holds the plug to its seat. This nut is fixed by a jam nut 21, the stem being threaded to receive said nuts. The washer 13 has openings 11 and the cap 16 has openings 25, as well as the opening through which the stem 20 extends. These openings allow bleeding or exhaust from the pipe whenever the plug 8 is lifted from its seat. The cap 14 on top of the plug casing has diametrically opposite inclined lugs 9 and 10, and also a stop lug 33 against which the lug 6, on the handle 17, strikes when the valve is closed. The cap is also provided with a bolt 32 which is slidable vertically through the cap and in a recess formed therefor in the wall of the casing. It may be raised or lowered by means of a key placed in the key hole 35. When raised, the top of the bolt projects beside the top of the lug 9 and will hold the valve 8 from its seat when the valve is turned to closed position.

In use, after the valve is opened as usual, and the train about to start, it will be the duty of the trainman to raise the bolt 32. If, then, an attempt be made to close the valve the handle 17 will ride up the inclined lugs 9 and 10 and upon the top of the bolt 32. This lifts the plug sufficiently to open the valve, and the air escapes around the plug and out through the openings 11 and 25. This applies the brakes, and there is thus no possibility that an unauthorized person can cut out a part of the train by tampering with the stop cock of the train pipe. If the bolt 32 is not raised, the lugs 9 and 10 will, nevertheless, when the handle 17 is turned thereover, lift the plug and bleed the valve, giving a slight application of the brakes, which may serve as a means of signaling to the engineer.

The valve is preferably provided with a hood 40, constructed of metal and supported upon the upper end of the stem 12 of the valve, for the purpose of inclosing the top portion of the cock and shedding rain and snow therefrom, thereby preventing interference with the operation of the valve in consequence of freezing.

I claim:

1. A valve for train pipes, comprising a casing, a turning plug seated therein, an exhaust outlet communicating with said seat, and closed by the plug when the valve is open, and means to lift the plug from its seat and open said outlet when the valve is closed.

2. A valve for train pipes, comprising a casing having a valve seat therein and an exhaust opening in said seat, a turning plug in the seat and arranged to close the opening when seated, means to lift the plug from its seat when turned in the direction to close the valve, and means to hold the plug to its seat when the valve is open.

3. A valve for train pipes, comprising a casing having a valve seat therein and an exhaust-opening in said seat, a cap on the casing having an inclined lug, a turning plug on the seat, having a stem extending through the cap and a handle thereon arranged to ride up the lug and lift the plug from the seat when the handle is turned to close the valve, and means to hold the plug to its seat when the valve is opened.

4. A valve for train pipes, comprising a casing having a valve seat therein and an exhaust-opening in said seat, a cap on the casing, a key-operated bolt slidable in the casing and having an inclined end which projects above the cap when the bolt is advanced, a turning plug on the seat, having a stem extending through the cap and a handle thereon arranged to ride up the inclination of the bolt and lift the valve from the seat when the valve is turned to closed position, and a spring to hold the plug to its seat when the valve is open.

5. A valve for train pipes, comprising a casing having a tapered bore therein and a cap at the bottom of said bore provided with outlets, and a cap at the top of said bore provided with an inclined lug, a turning plug fitting the bore and having stems at opposite ends, a handle on the upper stem arranged to ride up the lug and lift the plug from its seat when the valve is turned off, and a spring coiled around the lower stem and in compression between the plug and casing, to hold the plug to its seat when the valve is open.

In testimony whereof I affix my signature, in presence of two witnesses.

WILLIAM G. McMILLAN.

Witnesses:
MOTT G. SPAULDING,
ELIZABETH DRAVES.